(12) United States Patent
Ishijima et al.

(10) Patent No.: US 12,281,231 B2
(45) Date of Patent: *Apr. 22, 2025

(54) INK, INK SET, INK CONTAINER, RECORDING METHOD, AND RECORDING APPARATUS

(71) Applicant: RICOH COMPANY, LTD., Tokyo (JP)

(72) Inventors: Yukiko Ishijima, Tokyo (JP); Satoshi Kojima, Kanagawa (JP); Takayuki Shimizu, Kanagawa (JP); Shin Hasegawa, Tokyo (JP); Hiroki Kobayashi, Kanagawa (JP); Yuuki Matsushita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 879 days.

This patent is subject to a terminal disclaimer.

(21) Appl. No.: 17/424,333

(22) PCT Filed: Jan. 21, 2020

(86) PCT No.: PCT/JP2020/001958
§ 371 (c)(1),
(2) Date: Jul. 20, 2021

(87) PCT Pub. No.: WO2020/153358
PCT Pub. Date: Jul. 30, 2020

(65) Prior Publication Data
US 2022/0010159 A1   Jan. 13, 2022

(30) Foreign Application Priority Data

Jan. 22, 2019 (JP) .................................. 2019-008424
Nov. 28, 2019 (JP) .................................. 2019-214884

(51) Int. Cl.
*C09D 11/40* (2014.01)
*B41J 2/175* (2006.01)
(Continued)

(52) U.S. Cl.
CPC ........... *C09D 11/40* (2013.01); *B41M 5/0023* (2013.01); *B41M 7/0081* (2013.01);
(Continued)

(58) Field of Classification Search
CPC ..... C09D 11/40; C09D 11/101; C09D 11/107; C09D 11/38; B41M 5/0023; B41M 7/0081; B41M 3/008; B41J 2/17503
See application file for complete search history.

(56) References Cited

U.S. PATENT DOCUMENTS

2009/0087627 A1   4/2009   Watanabe et al.
2013/0065027 A1   3/2013   Mochizuki et al.
(Continued)

FOREIGN PATENT DOCUMENTS

CN   103402781   11/2013
CN   106715607   5/2017
(Continued)

OTHER PUBLICATIONS

"BYK-307." BYK, www.byk.com/en/products/additive-guide/byk-307. Accessed Jun. 17, 2024. (Year: 2024).*
(Continued)

*Primary Examiner* — Jennifer A Smith
*Assistant Examiner* — Jeffrey Eugene Barzach
(74) *Attorney, Agent, or Firm* — Grüneberg and Myers PLLC

(57) ABSTRACT

Provided is an active-energy-ray-curable ink including at least a surface tension modifier and including a monomer having a surface tension of 39 mN/m or greater in an amount of 20% by mass or greater but 60% by mass or less. Preferably, the ink includes a monomer having a surface tension of 43 mN/m or greater in an amount of 5% by mass or greater but 10% by mass or less.

12 Claims, 1 Drawing Sheet

(51) Int. Cl.
  *B41M 5/00* (2006.01)
  *B41M 7/00* (2006.01)
  *C09D 11/101* (2014.01)
  *C09D 11/107* (2014.01)
  *C09D 11/38* (2014.01)

(52) U.S. Cl.
  CPC .......... *C09D 11/101* (2013.01); *C09D 11/107* (2013.01); *C09D 11/38* (2013.01); *B41J 2/17503* (2013.01)

(56) References Cited

U.S. PATENT DOCUMENTS

| | | | |
|---|---|---|---|
| 2013/0222497 | A1 | 8/2013 | Nakano et al. |
| 2013/0335495 | A1* | 12/2013 | Umebayashi ........ B41M 5/0029 347/102 |
| 2014/0362152 | A1 | 12/2014 | Fukumoto et al. |
| 2015/0344709 | A1* | 12/2015 | Araki .................... C09D 11/40 522/167 |
| 2015/0368491 | A1 | 12/2015 | Araki |
| 2017/0218213 | A1 | 8/2017 | Torfs et al. |
| 2017/0218520 | A1 | 8/2017 | De Mondt et al. |
| 2017/0226355 | A1 | 8/2017 | Torfs et al. |
| 2017/0260405 | A1* | 9/2017 | Kumai ................. C09D 11/102 |
| 2018/0022949 | A1* | 1/2018 | Ikeda ................... C09D 11/322 347/102 |
| 2018/0333909 | A1 | 11/2018 | Arita et al. |
| 2019/0062580 | A1 | 2/2019 | Nakashima et al. |
| 2019/0092957 | A1* | 3/2019 | Nakano .................. C09D 11/38 |
| 2019/0100667 | A1 | 4/2019 | Miyaake et al. |
| 2019/0169454 | A1* | 6/2019 | Nakashima ............ C09D 11/36 |

FOREIGN PATENT DOCUMENTS

| | | |
|---|---|---|
| EP | 2682272 A1 | 1/2014 |
| JP | 2009-84424 | 4/2009 |
| JP | 2013-177530 | 9/2013 |
| JP | 5425241 B2 | 12/2013 |
| JP | 2014-189754 | 10/2014 |
| JP | 2014-237752 | 12/2014 |
| JP | 2015-083647 A | 4/2015 |
| JP | 6004971 B2 | 9/2016 |
| JP | 2016-190959 | 11/2016 |
| JP | 2017-149825 | 8/2017 |
| JP | 2020-056002 A | 4/2020 |

OTHER PUBLICATIONS

"SR508." Arkema Sartomer Americas, americas.sartomer.arkema.com/en/product-finders/product/f/sartomer_MonomerAcrylates_US/p/sr508/. Accessed Jun. 17, 2024. (Year: 2024).*
Japanese Office Action dated Nov. 29, 2023, in Japanese Application No. 2020-002808, 3 pages.
Chinese Office Action dated Apr. 29, 2022, in Chinese Application No. 202080009810.7, with English translation, 25 pages.
International Search Report Issued on May 6, 2020 for counterpart International Patent Application No. PCT/JP2020/001958 filed on Jan. 21, 2020.
Written Opinion Issued on May 6, 2020 for counterpart International Patent Application No. PCT/JP2020/001958 filed on Jan. 21, 2020.
Japanese Office Action received for Japanese Patent Application No. 2020-002808, dated on Aug. 2, 2023, 5 pages.

* cited by examiner

[Fig. 1]
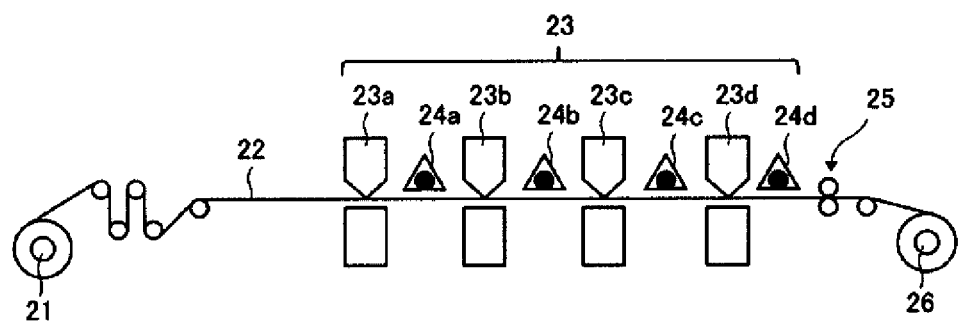
[Fig. 2A]
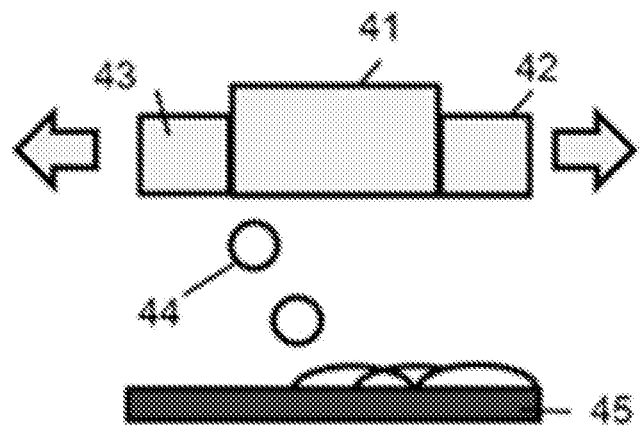
[Fig. 2B]
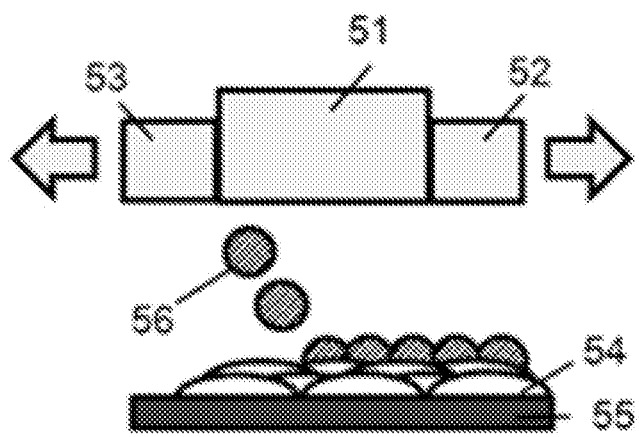

INK, INK SET, INK CONTAINER, RECORDING METHOD, AND RECORDING APPARATUS

TECHNICAL FIELD

The present disclosure relates to an ink, an ink set, an ink container, a recording method, and a recording apparatus.

BACKGROUND ART

Inkjet recording methods have been known as methods for forming images on recording media such as paper. The inkjet recording methods have a high ink consumption efficiency and an excellent resource saving efficiency, and can save the ink cost per unit recording.

Above all, active-energy-ray-curable inks have been paid attention recently as a system that has an excellent quick drying property, can be recorded on non-absorbable recording media, and tends not to bleed. Energy-ray-curable inks can be widely applied to various recording media, and used for, for example, signages and building materials.

There is a demand for controlling not only color developing properties of color inks but also gloss of inks in order to meet clients' various needs. However, because the inkjet recording methods form images while controlling the amounts of ink droplets to land on the recording media, the inkjet recording methods cannot easily have control on gloss, what with, for example, occurrence of film thickness variation in the ink film depending on the image density.

Methods for controlling gloss have been hitherto explored. For example, PTL 1 describes a method for controlling gloss by heating a recording medium and adjusting wettability/spreadability of an ink.

PTL 2 describes an inkjet recording method using an ink set for multiple layer formation for forming a clear ink layer over an image forming layer. This inkjet recording method realizes matte coating by curing the clear ink containing a surfactant with pinning light immediately after the clear ink has landed on the image forming layer formed of a color ink, i.e., before the clear ink wets and spreads. Meanwhile, the image forming ink is free of a surfactant, and the inkjet recording method simultaneously realizes gloss coating by optimizing the amount of a polymerization initiator in the clear ink and improving the wettability/spreadability of the clear ink over the image forming layer.

CITATION LIST

Patent Literature

PTL 1: Japanese Unexamined Patent Application Publication No. 2015-083647
PTL 2: Japanese Patent No. 5425241

SUMMARY OF INVENTION

Technical Problem

The method of PTL 1 has a problem in terms of cost efficiency. The method of PTL 2 has a problem in terms of productivity, and matte coating may degrade coating film uniformity.

The present disclosure has an object to provide an active-energy-ray-curable ink that can control low glossiness appearance without spoiling coating film uniformity.

Solution to Problem

According to one aspect of the present disclosure, an ink is as described in (1) below.

(1) An active-energy-ray-curable ink including at least a surface tension modifier, and including a monomer having a surface tension of 39 mN/m or greater in an amount of 20% by mass or greater but 60% by mass or less.

Advantageous Effects of Invention

The present disclosure can provide an active-energy-ray-curable ink that can control low glossiness appearance without spoiling coating film uniformity.

BRIEF DESCRIPTION OF DRAWINGS

FIG. 1 is a schematic view illustrating an example of the present disclosure.
FIG. 2A is a view illustrating a recording method using an ink set of the present disclosure.
FIG. 2B is a view illustrating a recording method using an ink set of the present disclosure.

DESCRIPTION OF EMBODIMENTS

The present disclosure relates to an ink described in (1) below. However, the present disclosure includes (2) to (17) described below as the embodiments of the present disclosure. Therefore, these embodiments will also be described simultaneously.

(1) An active-energy-ray-curable ink including at least a surface tension modifier and including a monomer having a surface tension of 39 mN/m or greater in an amount of 20% by mass or greater but 60% by mass or less.

(2) The ink according to (1), wherein an interfacial free energy $\gamma_{SL}$ at an interface between a cured coating film of the ink and the ink in a liquid state is 30.0 mJ/m$^2$ or higher.

(3) The ink according to (1) or (2) including the surface tension modifier in an amount of 0.01% by mass or greater but 0.5% by mass or less.

(4) The ink according to any one of (1) to (3) including the monomer having the surface tension of 39 mN/m or greater in an amount of 30% by mass or greater but 48% by mass or less.

(5) The ink according to any one of (1) to (4) including a monomer having a surface tension of 43 mN/m or greater in an amount of 5% by mass or greater but 10% by mass or less.

(6) An ink set for forming multiple layers, the ink set including a combination of inks including an ink A, which is the ink according to any one of (1) to (5), and an ink B, which is an active-energy-ray-curable ink free of the surface tension modifier.

(7) The ink set according to (6), wherein the ink A is a clear ink and the ink B is a color ink.

(8) The ink set according to (6) or (7), wherein an interfacial free energy $\gamma_{SL}$ at an interface between a cured coating film of the ink B and the ink B in a liquid state is 20.0 mJ/m$^2$ or lower.

(9) The ink set according to any one of (6) to (8), wherein the ink B includes a monomer having a surface tension of 34 mN/m or less in an amount of 15% by mass or greater but 50% by mass or less.

(10) The ink set according to any one of (6) to (9), wherein the ink B includes a monomer having a surface tension of 34 mN/m or less in an amount of 18% by mass or greater but 40% by mass or less.

(11) The ink set according to any one of (6) to (10), wherein the ink B includes an oligomer in an amount of 1% by mass or greater but 10% by mass or less.

(12) A recording method using the ink set according to any one of (6) to (11), the recording method including: applying the ink B; and applying the ink A.

(13) The recording method according to (12), including: firstly performing discharging and irradiation with an active energy ray of the ink B; and secondly performing discharging and irradiation with an active energy ray of the ink A.

(14) The recording method according to (13), wherein the recording method repeats the discharging and irradiation with an active energy ray forward and backward over a same region of an image eight times or more.

(15) An ink container including:
the ink according to any one of (1) to (5); and a container, wherein the ink is contained in the container.

(16) A recording apparatus including: a unit configured to discharge an ink; and the ink according to any one of (1) to (5).

(17) A recording apparatus including: a unit configured to discharge an ink; and the ink set according to any one of (6) to (11).

<<Ink>>

An ink of the present disclosure is an active-energy-ray-curable ink and contains at least a surface tension modifier and contains a monomer having a surface tension of 39 mN/m or greater in an amount of 20% by mass or greater but 60% by mass or less. The ink may further contain a polymerization initiator, a colorant, an organic solvent, and other components as needed. In the following description, "ink" may also be referred to as "composition", and "active-energy-ray-curable ink" may also be referred to as "active-energy-ray-curable composition".

<<Ink Set>>

The ink of the present disclosure can constitute an ink set including another ink for forming an underlying layer and the ink of the present disclosure for forming an overlying layer. The ink set is used for forming an image formed of a plurality of layers.

A preferable ink set is a combination of the ink of the present disclosure as a clear ink and the another ink as color inks including a yellow ink, a magenta ink, a cyan ink, and a black ink. Using this ink set, underlying layers (image layers) are formed first with the color inks and an overlying layer (clear ink layer) is then formed with the clear ink.

In the following description, the ink of the present disclosure when intended to form an overlying layer may be referred to as "ink A", and the inks for forming underlying layers may be referred to as "inks B".

<Surface Tension Modifier>

As a compound to be used in the present disclosure as the surface tension modifier, any known compound commonly used for modifying surface tension can be safely used except for so-called "pigment dispersant".

The surface tension modifier is not particularly limited. Examples of the surface tension modifier include ionic surfactants, nonionic surfactants, modified silicone surfactants, and organic fluoro compounds.

The ink of the present disclosure needs to contain the surface tension modifier. Through being oriented over the surface of an image, the surface tension modifier can be effective even if added in a small amount. Therefore, the content of the surface tension modifier is preferably 0.01% by mass or greater, and in order to ensure dischargeability, preferably 0.5% by mass or less.

Examples of the ionic surfactants include octadecyl ammonium acetate, and dodecyl trimethyl ammonium chloride.

Examples of the nonionic surfactants include polyoxyethylene sorbitan hexadecanoic acid ester, and polyoxyethylene octyl phenyl ether.

Examples of the modified silicone surfactants include polyether-modified silicone surfactants and olefin-modified silicone surfactants.

Examples of the organic fluoro compounds include fluorosurfactants and fluoro-compound resins.

Surface tension values specified in the present disclosure are values obtained through measurement in the manner described below according to Wilhelmy method (plate method) using an automatic surface tensiometer DY-300 available from Kyowa Interface Science, Inc.).

With the temperature of the monomer adjusted to 25 degrees C., the surface tension of the monomer is measured using a red-heat washed platinum plate. Evaluation is repeated until the difference between two continuous measurements becomes ±0.2 mN/m. The average of the two measurements is employed as the surface tension value.

<Monomer>

The active-energy-ray-curable ink of the present disclosure contains the monomer (polymerizable compound). The monomer needs to include a monomer having a surface tension of 39 mN/m or greater. The monomer is not particularly limited. Examples of the monomer include acryloyl morpholine (44.6 mN/m), N-vinyl caprolactam (39.1 mN/m), phenoxyethyl acrylate (39.3 mN/m), and ethoxylated (3) trimethylolpropane triacrylate (41.8 mN/m).

To obtain an effect of reducing glossiness, the content of the monomer needs to be 20% by mass or greater. In order to ensure coating film uniformity, the content of the monomer needs to be 60% by mass or less. The content of the monomer is preferably 30% by mass or greater but 48% by mass or less.

In order to further reduce glossiness, it is more preferable that the active-energy-ray-curable ink contain a monomer having a surface tension of 43 mN/m or greater in an amount of 5% by mass or greater. Moreover, it is preferable that the active-energy-ray-curable ink contain the monomer having a surface tension of 43 mN/m or greater in an amount of 10% by mass or less, because this ensures coating film uniformity by preventing the surface tension of the ink from being so high that the ink is repelled.

The monomer having a surface tension of 43 mN/m or greater is not particularly limited. Examples of the monomer having a surface tension of 43 mN/m or greater include polyethylene glycol (600) diacrylate (43.7 mN/m), acryloyl morpholine (44.6 mN/m), and dipentaerythritol hexaacrylate (43.0 mN/m).

It is preferable that the ink B of the ink set of the present disclosure contain a monomer having a surface tension of 34 mN/m or less in order to have a greater surface free energy difference from the ink A and better suppress wettability/spreadability of the ink. The monomer is not particularly limited. Examples of the monomer include dicyclopentanyloxy ethyl acrylate, cyclic trimethylolpropane formal acrylate, and isobornyl acrylate.

It is preferable that the content of the monomer having a surface tension of 34 mN/m or less in the ink B be 15% by mass or greater in order to suppress wettability/spreadability of the ink A, and be 50% by mass or less in order to ensure ink dischargeability. Moreover, it is preferable that the content of the monomer be 20% by mass or greater in order to better suppress wettability/spreadability, and be 40% by mass or less in order to ensure ink dischargeability.

<Oligomer>

It is preferable that the active-energy-ray-curable ink B of the present disclosure contain an oligomer in an amount of 1% by mass or greater but 10% by mass or less in order to increase glossiness through increasing points of contact with a base material. An oligomer means a polymer having a weight average molecular weight of 1,000 or greater but 30,000 or less. The weight average molecular weight can be measured by, for example, gel permeation chromatography (GPC).

The surface tension of the oligomer does not affect the glossiness of a coating film. Examples of the oligomer include aromatic urethane acrylate oligomers, aliphatic urethane acrylate oligomers, epoxy acrylate oligomers, polyester acrylate oligomers, and other special oligomers. One kinds of these kinds of oligomers may be used alone or two or more kinds of these kinds of oligomers may be used in combination.

Commercially available products can be used as the oligomer. Examples of commercially available products include: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 available from Nippon Gohsei Kagaku Kogyo KK.; CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 available from Sartomer Inc.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 available from Daicel-Cytec Co., Ltd.

<Curing Method>

Examples of the method for curing the curable composition of the present disclosure include curing by heating and curing by active energy rays. Of these methods, curing by active energy rays is preferable.

Active energy rays used for curing an active-energy-ray-curable composition of the present disclosure are not particularly limited, so long as they are able to give necessary energy for allowing polymerization reaction of polymerizable components in the composition to proceed. Examples of the active energy rays include electron beams, α-rays, β-rays, γ-rays, and X-rays, in addition to ultraviolet rays.

When a light source having a particularly high energy is used, polymerization reaction can be allowed to proceed without a polymerization initiator.

In addition, in the case of irradiation with ultraviolet ray, mercury-free is preferred in terms of protection of environment. Therefore, replacement with GaN-based semiconductor ultraviolet light-emitting devices is preferred from industrial and environmental point of view.

Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The active-energy-ray-curable composition of the present disclosure optionally contains a polymerization initiator.

The polymerization initiator produces active species such as a radical or a cation upon application of energy of an active energy ray and initiates polymerization of a polymerizable compound (monomer or oligomer).

As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azanium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, p-dimethyl amino ethylbenzoate, p-dimethyl amino benzoate-2-ethylhexyl, N,N-dimethyl benzylamine and 4,4'-bis(diethylamino)benzophenone. The content thereof is determined depending on the identity (type) of the polymerization initiator and the content thereof.

<Colorant>

The ink A may contain a colorant. The ink B that contains a colorant is more preferable. As the colorant, various pigments and dyes may be used that impart black, white, magenta, cyan, yellow, green, orange, and gloss colors such as gold and silver, depending on the intended purpose and requisite properties. A content of the colorant in the composition is not particularly limited, and may be appropriately determined considering, for example, a desired color density and dispersibility of the colorant in the composition. However, it is preferably from 0.1% by mass to 30% by mass relative to the total mass (100% by mass) of the composition.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment.

The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The active-energy-ray-curable composition of the present disclosure optionally contains an organic solvent although it is preferable to spare it.

The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Other Components>

The active-energy-ray-curable composition of the present disclosure optionally contains other known components.

The other known components are not particularly limited. Specific examples thereof include, but are not limited to, known articles such as polymerization inhibitors, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the curable-composition can be prepared by mixing a polymerizable monomer, an initiator, a polymerization inhibitor, and a surfactant. When using a colorant, the curable-composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization inhibitor, and a surfactant.

<Viscosity>

The viscosity of the active-energy-ray-curable composition of the present disclosure has no particular limit because it can be adjusted depending on the purpose and application devices. For example, if an ejecting device that ejects the composition from nozzles is employed, the viscosity thereof is preferably in the range of 3 mPa·s to 40 mPa·s, more preferably 5 mPa·s to 15 mPa·s, and particularly preferably 6 mPa·s to 12 mPa·s in the temperature range of 20 degrees C. to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1° 34'×R24) at a number of rotation of 50 rpm with a setting of the temperature of hemathermal circulating water in the range of 20 degrees C. to 65 degrees C. VISCOMATE VM-150III can be used for the temperature adjustment of the circulating water.

<Interfacial Free Energy>

In the present disclosure, as the definitions of interfacial free energy, an surface free energy of a cured coating film of the active-energy-ray-curable composition is expressed as $\gamma_S$, a surface tension of the active-energy-ray-curable composition in a liquid state is expressed as $\gamma_L$, and an interfacial free energy at an interface between the surface of a cured coating film of the active-energy-ray-curable composition and the active-energy-ray-curable composition in a liquid state is expressed as $\gamma_{SL}$. Relationship among the surface free energy $\gamma_S$ of a solid, the surface tension $\gamma_L$ of a liquid, and the interfacial free energy $\gamma_{SL}$ at a solid/liquid interface can be expressed using the Young equation: $\gamma_{SL} = \gamma_S - \gamma_L \cos\theta$.

As a result of earnest studies, the present inventors have found a correlation between glossiness of an image and interfacial free energy. That is, it has been found that a higher interfacial free energy makes the contact angle of the ink greater, to make wettability lower and glossiness of an image lower, and that a lower interfacial free energy makes the contact angle of the ink smaller, to make wettability higher and glossiness and color developability of an image higher.

When it is desired to control glossiness of the color ink having a high glossiness and a good color developability, combining a clear ink having a high interfacial free energy, specifically $\gamma_{SL}$ of 30.0 mJ/m$^2$ or higher with the color ink having a low interfacial free energy, specifically $\gamma_{SL}$ of 20.0 mJ/m$^2$ or lower makes it possible to have a reducing control on the glossiness by means of the clear ink.

Through control of the mix proportion of the monomer described above and control of the interfacial free energy, the active-energy-ray-curable composition of the present disclosure can have a more specified control on glossiness of an image.

<Application Field>

The application field of the active-energy-ray-curable composition of the present disclosure is not particularly limited. It can be applied to any field where active-energy-ray-curable compositions are used. For example, the curable composition is selected to a particular application and used for a resin for processing, a paint, an adhesive, an insulant, a releasing agent, a coating material, a sealing material, various resists, and various optical materials.

Furthermore, the active-energy-ray-curable composition of the present disclosure can be used as an ink to form two-dimensional texts, images, and designed coating film on various substrates and in addition as a solid object forming material to form a three-dimensional object. This three dimensional object forming material may also be used as a binder for powder particles used in a powder layer laminating method of forming a three-dimensional object by repeating curing and layer-forming of powder layers.

An apparatus for fabricating a three-dimensional object by the active-energy-ray-curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the active-energy-ray-curable composition and processed products obtained by processing structures having the cured materials on a substrate. The processed product is fabricated by, for example, heat-drawing and punching a cured material or structure having a sheet-like form or film-like form. Examples thereof are products that need to be fabricated by processing after decoration, such as gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure contains the active-energy-ray-curable composition and is suitable for the applications as described above. For example, if the active-energy-ray-curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

<Image Forming Method and Image Forming Apparatus>

In order to cure the curable composition of the present disclosure with an active energy ray, the image forming method of the present disclosure includes an irradiating step of irradiating the curable composition of the present disclosure with an active energy ray. The image forming apparatus of the present disclosure includes at least an irradiator to irradiate the curable composition of the present disclosure with an active energy ray and a storing part containing the active-energy-ray-curable composition of the present disclosure. The storing part may include the container mentioned above. Furthermore, the method and the apparatus may respectively include a discharging step and a discharging device to discharge the active energy ray curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a recording apparatus (image forming apparatus) equipped with an inkjet discharging device. Printing units 23a, 23b, 23c, and 23d respectively having ink cartridges and discharging heads for yellow, magenta, cyan, and black active-energy-ray-curable inks discharge the inks onto a recording medium 22 fed from a supplying roller 21. Thereafter, light sources 24a, 24b, 24c, and 24d configured to cure the inks emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. For multiple layer formation using the ink set including the ink A and the ink B, a light source for discharging a clear ink and curing the ink may be included. Multiple layer formation will be described in detail below. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples thereof include, but are not limited to, paper, film, ceramics, glass, metal, or complex materials thereof. The recording medium 22 takes a sheet-like form but is not limited thereto. The image forming apparatus may have a one-side printing configuration and/or a two-side printing configuration. Not only recording media commonly used, but also cardboard, building materials such as wallpaper and flooring, concretes, cloths for clothes such as T-shirts, textiles, and leather can be suitably used.

Optionally, multiple colors can be printed with no or weak active energy ray from the light sources 24a, 24b, and 24c followed by irradiation of the active energy ray from the light source 24d. As a result, energy and cost can be saved.

<<Multiple Layer Formation>>

FIG. 2A and FIG. 2B are views illustrating a method using the ink set of the present disclosure to apply inks over a recording medium to record multiple layers of images. In a first step, as illustrated in FIG. 2A, the ink B (44) is discharged from an inkjet head 41 to a recording medium 45, and irradiated with an active energy ray from active energy ray sources 42 and 43. Next, in a second step, as illustrated in FIG. 2B, the ink A (56) is discharged from an inkjet head 51 onto the ink B, and irradiated with an active energy ray from active energy ray sources 52 and 53. In this way, it is preferable to include the first step of discharging the ink B and irradiating the ink B with an active energy ray and the second step of discharging the ink A and irradiating the ink A with an active energy ray, because this reduces glossiness. The arrows in FIG. 2A and FIG. 2B indicate a forward path and a backward path in the main scanning direction. In order to further reduce glossiness, it is more preferable to repeat the step over the same region of an image, which is being formed, forward and backward in the main scanning direction eight times or more. It is preferable to repeat the step forward and backward fourteen times or less, in order not to reduce productivity. Both of or either one of the active energy ray sources 42 and 43 in FIG. 2A or 52 and 53 in FIG. 2B may be used. The active energy ray sources may be mounted only on one side of an inkjet head.

EXAMPLES

The present disclosure will be described below by way of Examples. The present disclosure should not be construed as being limited to these Examples.

Examples 1 to 20 and Comparative Examples 1 to 3 relate to the ink A. Examples 21 to 41 and Comparative Example 4 relate to the ink set including the ink A and the ink B.

Abbreviations, manufacturer names, and product names of the materials used in Examples and Comparative Examples are presented in Table 1. The abbreviations a to d indicate that the materials concerned are the components classified below.

(a1) Monomer having a surface tension of 39 mN/m or greater (a2) Monomer having a surface tension of 34 mN/m or less (a3) Monomer having a surface tension of greater than 34 mN/m but less than 39 mN/m (a4) Oligomer (b) Surface tension modifier (c) Colorant (d) Photopolymerization initiator

TABLE 1

| Component | abbrev. | Compound name <surface tension (mN/m)> | Manufacturer name and product name |
|---|---|---|---|
| Monomer | a1-1 | N-vinyl caprolactam <39.1> | "VCAP" from ISP |
| | a1-2 | Tricyclodecane dimethylol diacrylate <39.9> | "KAYARADR-684" from Nippon Kayaku Co., Ltd. |
| | a1-3 | Polyethylene glycol (600) diacrylate <43.7> | "SR 610NS" from Sartomer |
| | a1-4 | Acryloyl morpholine <44.6> | "ACMO" from KJ Chemicals Co., Ltd. |
| | a2-1 | Dicyclopentanyloxy ethyl acrylate <32.6> | "FA-512" from Hitachi Chemical Co., Ltd. |
| | a2-2 | Cyclic trimethylolpropane formal acrylate <33.1> | "CTFA" from Osaka Organic Chemical Industry Ltd. |
| | a2-3 | Isobornyl acrylate <33.0> | "IBXA" from Osaka Organic Chemical Industry Ltd. |
| | a2-4 | Isodecyl acrylate <28.6> | "SR 395NS" from Sartomer |
| | a3-1 | Tetrahydrofurfuryl acylate <36.5> | "SR 285" from Sartomer |
| | a3-2 | Trimethylolpropane triacrylate <36.1> | "SR 3518" from Sartomer |
| Oligomer | a4-1 | CN963(Urethane acrylate oligomer) | "CN 963" from Sartomer |
| | a4-2 | CN982(Urethane acrylate oligomer) | "CN 982" from Sartomer |
| | a4-3 | CN110 NS(Epoxy acrylate oligomer) | "CN 110NS" from Sartomer |
| | a4-4 | CN2271(Polyester acrylate oligomer) | "CN 2271" from Sartomer |
| Surface Tension modifier | b-1 | Polyether-modified silicone surfactant | "KF-945" from Shin-Etsu Chemical Co., Ltd. |
| | b-2 | Polyester-modified silicone surfactant | "TEGO WET-270" from Evonik Japan Co., Inc. |
| Colorant | c-1 | Pigment PR122/Dispersant BYK9151 | — |
| | c-2 | Pigment PR150/Dispersant BYK9151 | — |
| | c-3 | Pigment PR15:4/SOLSPERSE 32000 | — |
| | c-4 | Pigment PB k7/SOLSPERSE 32000 | — |
| | c-5 | Pigment TiO/SOLSPERSE 32000 | — |
| Photo-polymerization initiator | d-1 | Phenylbis (2,4,6-trimethylbenzoyl) phosphine oxide | "IRGACURE 819" from BASF Japan Ltd. |

Examples 1 to 20 and Comparative Examples 1 to 3

(Preparation of Inks A)

The materials (a) to (d) mentioned above were mixed at the blending ratio (the value being in the unit of part by mass) presented in Tables 2-1-1 and 2-1-2 and Tables 2-2-1 and 2-2-2 below, to obtain the inks A-1 to A-23 of Examples 1 to 20 and Comparative Examples 1 to 3.

Examples 21 to 41 and Comparative Example 4

(Preparation of Inks B)

The materials (a) to (d) mentioned above were mixed at the blending ratio (the value being in the unit of part by mass) presented in Tables 3-1-1 and 3-1-2, Tables 3-2-1 and 3-2-2, and Tables 3-3-1 and 3-3-2 below, to obtain the inks B-1 to B-18.

(Ink Sets)

The inks A of Examples and Comparative Examples and the inks B prepared above were combined as presented in Tables 3-1-1 and 3-1-2, Tables 3-2-1 and 3-2-2, and Tables 3-3-1 and 3-3-2 below, to obtain ink sets of Examples 21 to 41 and Comparative Example 4.

(Evaluation)

Using the inks and the ink sets obtained above, images were formed in the manner described below, and the images were evaluated.

<Image Formation>

Using an inkjet discharging apparatus mounted with an MH5420 head (available from Ricoh Company, Ltd), each of the inks A-1 to A-23 of Examples 1 to 20 and Comparative Examples 1 to 3 obtained was discharged at a resolution of 1,200 dpi×1,200 dip, in a size of drop of 15 pL per drop, and at a printing speed of 420 mm/second. The inks were cured through light irradiation with an ultraviolet light source, which was a UV-LED device for an inkjet printer (device name: UV-LED MODULE, single-path water cooling, available from Ushio Inc.). The distance between the head and the light source was 200 mm.

In the curing, the inks were cured with a wavelength within a UVA region, at 1 W/cm$^2$, and with a light volume of 3 J/cm$^2$. The light volume was measured with UV POWER PUCK (registered trademark) II (available from EIT) within a UVA region.

A polycarbonate base material (product name: IUPILON NF-2000, available from Mitsubishi Gas Chemical Company, Inc., with an average thickness of 0.5 mm) was used as the recording medium.

Solid coating films having a size of 4 cm×4 cm cured as described above were used as images for evaluation. Images for evaluation for the ink sets of Examples 21 to 41 and Comparative Example 4 were obtained by forming underlying coating films of the inks B-1 to B-18 in the manner described above, and subsequently forming overlying coating films of the inks A in the same manner.

<Glossiness>

Glossiness was measured and evaluated using a micro-tri-gloss meter available from Byk-Gardner GmbH).

An image drawn at 600×400 dpi was evaluated at five positions, to obtain the average glossiness of the five position.

Glossiness values at 60° were evaluated according to the criteria described below.

Evaluation: 60° glossiness

7: Less than 4

6: 4 or greater but less than 5

5: 5 or greater but less than 7.5
4: 7.5 or greater but less than 10
3: 10 or greater but less than 12.5
2: 12.5 or greater but less than 15
1: 15 or greater <Coating Film Uniformity>

Whether ink repelling occurred was visually evaluated according to the criteria described below.

Evaluation: Coating film condition

B: No ink repelling occurred and a uniform coating film was formed.

C: The coating film was formed all over, but the film thickness was slightly nonuniform in some portions.

D: The degree of nonuniformity was significant.

<Dischargeability>

With a MH2620 head available from Ricoh Company, Ltd., the number of nozzles that became unable to discharge through continuous discharging for 1 minute at a frequency of 20 kHz at an ink discharging speed of 7±1 m/s was evaluated. The number of nozzles that became unable to discharge was evaluated according to the criteria described below.

Evaluation: Number of nozzles that became unable to discharge

B: from 0 to 3 nozzles
C: from 4 to 10 nozzles
D: 11 nozzles or more

<Interfacial Free Energy>

Interfacial free energy $\gamma_{SL}$ was calculated according to the procedures (1) to (10) described below, and evaluated according to the criteria described below.

VH: 35.0 mJ/cm² or higher
H: 30.0 mJ/cm² or higher but lower than 35.0 mJ/cm²
M: higher than 20.0 mJ/cm² but lower than 30.0 mJ/cm²
L: 20.0 mJ/cm² or lower (1) A value obtained through measurement in the procedures described below according to Wilhelmy method (plate method) using an automatic surface tensiometer DY-30.0 available from Kyowa Interface Science, Inc. was used as the surface tension $\gamma_L$ of the ink. With the temperature of the ink adjusted to 25 degrees C., the surface tension of the ink was measured using a red-heat washed platinum plate. Evaluation was repeated until the difference between two continuous measurements became ±0.2 mN/m. The average of the two measurements was employed as the surface tension value.

(2) Using a wire bar, the ink was coated over a flat smooth plate of polycarbonate in a manner that the ink would have a film thickness of about 10 micrometers.

(3) Using FIREJET 240 (with a central wavelength of 395 nm) available from Phoseon Technology, the ink film produced in (2) was irradiated with an integrated energy volume of 3,000 mJ/cm² at an illuminance of 1,000 mW/cm².

(4) The cured ink film produced in (3) was set on a contact angle meter.

(5) Using a glass syringe, the ink was dropped onto the ink film set in (4).

(6) A contact angle value at the timing when 47 seconds passed since the ink was dropped was obtained as the contact angle θ of the ink over the cured ink film.

(7) Using a glass syringe, diiodo-methane, α-bromonaphthalene, pure water, formamide, and ethylene glycol were each dropped onto the ink film set in (4).

(8) Contact angle values at the timing when 47 seconds passed since the samples were dropped were obtained as contact angle values of the samples over the cured ink film.

(9) Using the contact angle values of diiodo-methane, α-bromonaphthalene, pure water, formamide, and ethylene glycol, the surface free energy $\gamma_S$ of the cured ink film was calculated using the theoretical formula of Kitazaki and Hata, represented by the formula (1) below, where $\gamma_S^a$ represents a nonpolar component of the surface free energy, $\gamma_S^b$ represents a polar component of the surface free energy, $\gamma_S^c$ represents a hydrogen bonding component of the surface free energy, $\gamma_L^a \gamma_L^a$ represents a nonpolar component of the surface tension, $\gamma_L^b$ represents a polar component of the surface tension, $\gamma_L^c$ represents a hydrogen bonding component of the surface tension, and $\gamma_S = \gamma_S^a + \gamma_S^b + \gamma_S^c$.

$$\gamma_L(1+\cos\theta) = 2(\gamma_L^a \gamma_S^a)^{1/2} + 2(\gamma_L^b \gamma_S^b)^{1/2} + 2(\gamma_L^c \gamma_S^c)^{1/2} \quad \text{Formula (1):}$$

(10) The interfacial free energy $\gamma_{SL}$ was calculated according to Young equation: $\gamma_{SL} = \gamma_S - \gamma_L \cos\theta$.

<Color Developability of Color Ink>

The saturation of an image of a color ink printed using an inkjet discharging apparatus at 600×1,200 dpi, with 8 passes, and in an ink applying amount of 1.7 mg/cm² was measured using X-RITE939 and evaluated according to the criteria described below.

<<For Cyan>>
B: 55 or higher
C: 45 or higher but lower than 55
D: Lower than 45

<<For Magenta>>
B: 70 or higher
C: 60 or higher but lower than 70
D: Lower than 60

<<For Yellow>>
B: 90 or higher
C: 80 or higher but lower than 90
D: Lower than 80

<Total Evaluation>

A: Glossiness evaluation was 6 or 7 and all of the other evaluations were B.

B: Glossiness evaluation was 4 or 5, and one or less of the other evaluations was C (regarding dischargeability of Examples 21 to 41, the number of C evaluations is counted as 1 both when either the ink A or the ink B was evaluated as C and when both of the ink A and the ink B were evaluated as C).

C: Glossiness evaluation was 3.

D: One or more of the evaluations was/were D, or glossiness evaluation was 2 or less.

TABLE 2-1-1

|  |  |  | Ex. 1 Ink A-1 | Ex. 2 Ink A-2 | Ex. 3 Ink A3 | Ex. 4 ink A4 | Ex. 5 Ink A5 | Ex. 6 Ink A6 |
|---|---|---|---|---|---|---|---|---|
| Monomer having surface tension of | Monomer having surface tension of 39 or greater but less than 43 | a1-1 a1-2 |  | 38 | 38 | 38 | 40 | 40 | 10 |

TABLE 2-1-1-continued

|  |  |  | Ex. 1 Ink A-1 | Ex. 2 Ink A-2 | Ex. 3 Ink A3 | Ex. 4 ink A4 | Ex. 5 Ink A5 | Ex. 6 Ink A6 |
| --- | --- | --- | --- | --- | --- | --- | --- | --- |
| 39 or greater | Monomer having surface tension of 43 or greater | a1-3 |  |  |  |  |  | 7 |
|  |  | a1-4 | 7 | 7 | 7 | 5 | 10 |  |
|  | Monomer having surface tension of 34 or less | a2-1 | 34.7 | 14.7 | 14.7 | 49.7 | 44.7 |  |
|  |  | a2-2 |  |  |  |  |  | 47.7 |
|  |  | a2-3 |  |  |  |  |  |  |
|  |  | a2-4 |  |  |  |  |  |  |
| Monomer other than above |  | a3-1 | 10 | 10 |  | 5 | 5 |  |
|  |  | a3-2 | 10 |  | 10 |  |  | 5 |
| Surface tension modifier |  | b-1 | 0.2 | 0.2 | 0.2 | 0.2 | 0.2 | 0.2 |
|  |  | b-2 |  |  |  |  |  |  |
| Pigment dispersant |  | c-1 |  |  |  | 30 |  |  |
|  |  | c-2 |  | 30 |  |  |  |  |
| Photopolymerization initiator |  | d-1 | 0.1 | 0.1 | 0.1 | 0.1 | 0.1 | 0.1 |
| Inkjet recording method (Repeating number of forward and backward main-direction scans over same region) |  |  | 10 | 8 | 4 | 8 | 8 | 8 |
| Evaluation result | Glossiness |  | 6 | 5 | 4 | 4 | 5 | 5 |
|  | Coating film uniformity |  | B | B | B | B | C | C |
|  | Dischargeability |  | B | B | B | B | B | B |
|  | Interfacial free energy $\gamma_{SL}$ |  | VH | VH | VH | VH | VH | VH |
|  | Total evaluation |  | A | B | B | B | B | B |

TABLE 2-1-2

|  |  |  | Ex. 7 Ink A-7 | Ex. 8 ink A-8 | Ex. 9 Ink A-9 | Ex. 10 Ink A-10 | Ex. 11 Ink A-11 | Ex. 12 Ink A-12 |
| --- | --- | --- | --- | --- | --- | --- | --- | --- |
| Monomer having surface tension of 39 or greater | Monomer having surface tension of 39 or greater but less than 43 | a1-1 |  |  |  |  | 40 | 20 |
|  |  | a1-2 | 15 | 30 | 45 | 55 |  | 20 |
|  | Monomer having surface tension of 43 or greater | a1-3 | 5 |  |  | 5 |  |  |
|  |  | a1-4 |  |  |  |  |  |  |
|  | Monomer having surface tension of 34 or less | a2-1 |  |  |  | 24.7 | 19.7 | 39.7 | 39.7 |
|  |  | a2-2 |  |  | 25 |  |  | 10 |
|  |  | a2-3 | 74.7 |  |  | 20 |  | 10 |
|  |  | a2-4 |  | 69.7 |  |  |  |  |
| Monomer other than above |  | a3-1 |  |  | 5 |  | 20 |  |
|  |  | a3-2 | 5 |  |  |  |  |  |
| Surface tension modifier |  | b-1 | 0.2 | 0.2 | 0.2 | 0.2 | 0.2 | 0.2 |
|  |  | b-2 |  |  |  |  |  |  |
| Pigment dispersant |  | c-1 |  |  |  |  |  |  |
|  |  | c-2 |  |  |  |  |  |  |
| Photopolymerization initiator |  | d-1 | 0.1 | 0.1 | 0.1 | 0.1 | 0.1 | 0.1 |
| Inkjet recording method (Repeating nuember of forward and backward main-direction scans over same region) |  |  | 8 | 8 | 8 | 8 | 8 | 8 |
| Evaluation result | Glossiness |  | 3 | 4 | 4 | 5 | 4 | 4 |
|  | Coating film uniformity |  | B | B | B | C | B | B |
|  | Dischargeability |  | C | C | C | B | B | B |
|  | Interfacial free energy $\gamma_{SL}$ |  | VH | VH | VH | VH | VH | VH |
|  | Total evaluation |  | C | B | B | B | B | B |

TABLE 2-2-1

| | | Ex. 13 Ink A-13 | Ex. 14 Ink A-14 | Ex. 15 Ink A-15 | Ex. 16 Ink A-16 | Ex. 17 Ink A-17 |
|---|---|---|---|---|---|---|
| Monomer having surface tension of 39 or greater | Monomer having surface tension of 39 or greater but less than 43 | a1-1 | | | | | |
| | | a1-2 | 40 | 40 | 20 | 40 | 40 |
| | Monomer having surface tension 43 or greater | a1-3 | | | | 5 | |
| | | a1-4 | | | | | |
| Monomer having surface tension of 34 or less | | a2-1 | 39.89 | 59.4 | | 19.2 | 59.7 |
| | | a2-2 | | | | 10 | |
| | | a2-3 | 10 | | 30 | 10 | |
| | | a2-4 | 10 | | 49.892 | 10 | |
| Monomer other than above | | a3-1 | | | | | |
| | | a3-2 | | | | 5 | |
| Surface tension modifier | | b-1 | 0.01 | 0.5 | 0.008 | 0.7 | |
| | | b-2 | | | | | 0.2 |
| Pigment dispersant | | c-1 | | | | | |
| | | c-2 | | | | | |
| Photopoymerization initiator | | d-1 | 0.1 | 0.1 | 0.1 | 0.1 | 0.1 |
| Inkjet recording method (Repeating number of forward and backward main-direction scams over same region) | | | 8 | 8 | 4 | 8 | 8 |
| Evaluation results | Glossiness | | 3 | 5 | 3 | 5 | 4 |
| | Coating film uniformity | | B | B | B | B | B |
| | Dischargeability | | B | B | C | C | B |
| | Interfacial free energy $\gamma_{SL}$ | | H | VH | H | VH | VH |
| | Total evaluation | | C | B | C | B | B |

TABLE 2-2-2

| | | | Ex. 18 Ink A18 | Ex. 19 Ink A-19 | Ex. 20 Ink A-20 | Comp. Ex. 1 Ink A-21 | Comp. Ex. 2 Ink A-22 | Comp. Ex. 3 Ink A-23 |
|---|---|---|---|---|---|---|---|---|
| Monomer having surface tension of 39 or greater | Monomer having surface tension of 39 or greater but less than 43 | a1-1 | | | | 15 | | |
| | | a1-2 | 40 | 20 | 38 | | | |
| | Monomer having surface tension of 43 or greater | a1-3 | | | | | 65 | |
| | | a1-4 | 10 | | 7 | | | 40 |
| Monomer having surface tension of 34 or less | | a2-1 | 34.7 | | 29.7 | 24.7 | 34.7 | 59.9 |
| | | a2-2 | | | | | | |
| | | a2-3 | | 30 | | 30 | | |
| | | a2-4 | | 39.982 | | 30 | | |
| Monomer other than above | | a3-1 | 5 | | 10 | | | |
| | | a3-2 | | | 10 | | | |
| Surface tension modifier | | b-1 | 0.2 | 0.008 | 0.2 | 0.2 | 0.2 | |
| | | b-2 | | | | | | |
| Pigment dispersant | | c-1 | | | 5 | | | |
| | | c-2 | 10 | 10 | | | | |
| Photopolymerization initiator | | d-1 | 0.1 | 0.1 | 0.1 | 0.1 | 0.1 | 0.1 |
| Inkjet recording method (Repeating numeber of forward and backward main-direction scans over same region) | | | 8 | 8 | 10 | 8 | 8 | 8 |
| Evaluation result | Glossiness | | 5 | 3 | 6 | 2 | 5 | 1 |
| | Coating film uniformity | | C | B | B | B | D | B |
| | Dischargeability | | B | C | B | C | B | B |
| | Interfacial free energy $\gamma_{SL}$ | | VH | H | VH | M | H | L |
| | Total evaluation | | B | C | A | D | D | D |

TABLE 3-1-1

| | | Ex. 21 | | Ex. 22 | | Ex. 23 | | Ex. 24 | |
|---|---|---|---|---|---|---|---|---|---|
| | | Ink A-1 | Ink B-1 | Ink A-15 | Ink B-1 | Ink A-2 | Ink B-2 | Ink A-3 | Ink B-3 |
| Monomer having surface tension of 39 or greater | Monomer having surface tension of 39 or greater but less than 43 | a1-1 | | | 5 | | 5 | | | |
| | | a1-2 | 38 | | 20 | | 38 | 5 | 38 | |
| | Monomer having surface tension of 43 or greater | a1-3 | | | | | | | | 5 |
| | | a1-4 | 7 | | | | 7 | | 7 | |
| Monomer having surface tension of 34 or less | | a2-1 | 34.7 | | | | 14.7 | | 14.7 | |
| | | a2-2 | | | | | | | | |
| | | a2-3 | | 30 | 30 | 30 | | | | 40 |
| | | a2-4 | | | 49.89 | | | 20 | | |
| Monomer other than above | | a3-1 | 10 | 34.9 | | 34.9 | 10 | 44.9 | | 24.9 |
| | | a3-2 | 10 | | | | | | 10 | |
| Oligomer | | a4-1 | | | | | | | | |
| | | a4-2 | | | | | | | | |
| | | a4-3 | | | | | | | | |
| | | a4-4 | | | | | | | | |
| Surface tension modifer | | b-1 | 0.2 | | 0.008 | | 0.2 | | 0.2 | |
| | | b-2 | | | | | | | | |
| Pigment dispersant | | c-1 | | 30 | | 30 | | | 30 | |
| | | c-2 | | | | | 30 | | | |
| | | c-3 | | | | | | | | 30 |
| | | c-4 | | | | | | | | |
| | | c-5 | | | | | | 30 | | |
| Photopolymerization initiator | | d-1 | 0.1 | 0.1 | 0.1 | 0.1 | 0.1 | 0.1 | 0.1 | 0.1 |
| Inkjet recording method (Repeating number of forward and backward main-direction scans over same region) | | | 10 | | 10 | | 8 | | 8 | |
| Evaluation result | Glossiness | | 6 | | 6 | | 5 | | 5 | |
| | Coating film uniformity | | B | | B | | B | | B | |
| | Dischargeability | | B | B | B | B | B | B | B | C |
| | Interfacial free energy $\gamma_{SL}$ | | VH | L | H | L | VH | L | VH | L |
| | Color developability of color ink | | — | B | — | B | — | B | — | B |
| | Total evaluation | | A | | C | | B | | B | |

TABLE 3-1-2

| | | Ex. 25 | | Ex. 26 | | Ex. 27 | | Ex. 28 | |
|---|---|---|---|---|---|---|---|---|---|
| | | Ink A-1 | Ink B-4 | Ink A-1 | Ink B-5 | Ink A-4 | Ink B-6 | Ink A-1 | Ink B-7 |
| Monomer having surface tension of 39 or greater | Monomer having surface tension of 39 or greater but less than 43 | a1-1 | | | | | | | | |
| | | a1-2 | 38 | | 38 | 2 | 40 | | 38 | |
| | Monomer having surface tension of 43 or greater | a1-3 | | | | 2 | | | | |
| | | a1-4 | 7 | 5 | 7 | | 5 | | 7 | |
| Monomer having surface tension of 34 or less | | a2-1 | 34.7 | | 34.7 | | 49.7 | 30 | 34.7 | |
| | | a2-2 | | 15 | | 50 | | | | |
| | | a2-3 | | | | | | | | 30 |
| | | a2-4 | | | | | | | | |
| Monomer other than above | | a3-1 | 10 | 49.9 | 10 | 15.9 | 5 | 19.9 | 10 | |
| | | a3-2 | 10 | | 10 | | | 20 | 10 | 39.7 |
| Oligomer | | a4-1 | | | | | | | | |
| | | a4-2 | | | | | | | | |
| | | a4-3 | | | | | | | | |
| | | a4-4 | | | | | | | | |
| Surface tension modifier | | b-1 | 0.2 | | 0.2 | | 0.2 | | 0.2 | 0.2 |
| | | b-2 | | | | | | | | |
| Pigment dispersant | | c-1 | | | | | | | | |
| | | c-2 | | | | | | | | |
| | | c-3 | | | | | | | | 30 |
| | | c-4 | | 30 | | | | | | |
| | | c-5 | | | | 30 | | 30 | | |

TABLE 3-1-2-continued

|  |  | Ex. 25 | | Ex. 26 | | Ex. 27 | | Ex. 28 | |
|---|---|---|---|---|---|---|---|---|---|
|  |  | Ink A-1 | Ink B-4 | Ink A-1 | Ink B-5 | Ink A-4 | Ink B-6 | Ink A-1 | Ink B-7 |
| Photopolymerization initiator | d-1 | 0.1 | 0.1 | 0.1 | 0.1 | 0.1 | 0.1 | 0.1 | 0.1 |
| Inkjet recording method (Repeating numeber of forward and backward main-direction scans over same region) | | 8 | | 8 | | 8 | | 8 | |
| Evaluation result | Glossiness | 4 | | 5 | | 5 | | 3 | |
|  | Coating film uniformity | C | | B | | B | | B | |
|  | Dischargeability | B | B | C | C | B | B | B | B |
|  | Interfacial free energy $\gamma_{SL}$ | VH | L | VH | L | VH | L | VH | H |
|  | Color developability of color ink | — | B | — | B | — | B | — | C |
|  | Total evaluation | B | | B | | B | | C | |

TABLE 3-2-1

|  |  |  | Ex. 29 | | Ex. 30 | | Ex. 31 | | Ex. 32 | |
|---|---|---|---|---|---|---|---|---|---|---|
|  |  |  | Ink A-18 | Ink B-8 | Ink A-9 | Ink B-9 | Ink A-10 | Ink B-10 | Ink A-1 | Ink B-9 |
| Monomer having surface tension of 39 or greater | Monomer having surface tension of 39 or greater but less than 43 | a1-1 a1-2 | 40 | | 45 | | 55 | | 38 | |
|  | Monomer having surface tension of 43 or greater | a1-3 a1-4 | 10 | | | | 5 | | 7 | |
| | Monomer having surface tension of 34 or less | a2-1 a2-2 a2-3 a2-4 | 34.7 | 30 | 24.7 25 | 10 | 19.7 | 55 20 | 34.7 | 10 |
| | Monomer other than above | a3-1 a3-2 | 5 | 39.9 20 | 5 | 59.9 | | 14.9 | 10 10 | 59.9 |
| | Oligomer | a4-1 a4-2 a4-3 a4-4 | | | | | | | | |
| | Surface tension modifier | b-1 b-2 | 0.2 | | 0.2 | | 0.2 | | 0.2 | |
| | Pigment dispersant | c-1 c-2 c-3 c-4 c-5 | | 10 10 | | 30 | | 30 | | 30 |
| Photopolymerization initiator | | d-1 | 0.1 | 0.1 | 0.1 | 0.1 | 0.1 | 0.1 | 0.1 | 0.1 |
| Inkjet recording method (Repeating number of forward and backward main-direction scans over same region) | | | 8 | | 8 | | 8 | | 8 | |
| Evaluation result | Glossiness | | 4 | | 3 | | 3 | | 4 | |
| | Coating film uniformity | | C | | B | | C | | B | |
| | Dischargeability | | B | B | B | B | B | C | B | B |
| | Interfacial free energy $\gamma_{SL}$ | | VH | L | VH | L | VH | L | VH | L |
| | Color developability of color ink | | — | B | — | B | — | B | — | B |
| | Total evaluation | | B | | C | | C | | B | |

TABLE 3-2-2

|  |  |  | Ex. 33 | | Ex. 34 | | Ex. 35 | |
|---|---|---|---|---|---|---|---|---|
|  |  |  | Ink A-19 | Ink B-11 | Ink A-20 | Ink B-11 | Ink A-2 | Ink B-12 |
| Monomer having surface tension of 39 or greater | Monomer having surface tension of 39 or greater but less than 43 | a1-1 | | | | | | |
| | | a1-2 | 20 | | 38 | | 38 | 5 |
| | Monomer having surface tension of 43 or greater | a1-3 | | 5 | | 5 | | |
| | | a1-4 | | 7 | | 7 | | |
| Monomer having surface tension of 34 or less | | a2-1 | | | 29.7 | | 14.7 | |
| | | a2-2 | | | | | | |
| | | a2-3 | 30 | 55 | | 55 | | |
| | | a2-4 | 39.89 | | | | | 18 |
| Monomer other than above | | a3-1 | | 29.7 | 10 | 29.7 | 10 | 46.9 |
| | | a3-2 | | | 10 | | | |
| Oligomer | | a4-1 | | | | | | |
| | | a4-2 | | | | | | |
| | | a4-3 | | | | | | |
| | | a4-4 | | | | | | |
| Surface tension modifier | | b-1 | 0.008 | 0.2 | 0.2 | 0.2 | 0.2 | |
| | | b-2 | | | | | | |
| Pigment dispersant | | c-1 | | | 5 | | | |
| | | c-2 | 10 | 10 | | | 30 | |
| | | c-3 | | | | | | |
| | | c-4 | | | | | 10 | |
| | | c-5 | | | | | | 30 |
| Photopolymerization initiator | | d-1 | 0.1 | 0.1 | 0.1 | 0.1 | 0.1 | 0.1 |
| Inkjet recording method (Repeating numeber of forward and backward main-direction scans over same region) | | | 4 | | 4 | | 10 | |
| Evaluation result | Glossiness | | 3 | | 3 | | 5 | |
| | Coating film uniformity | | B | | B | | B | |
| | Dischargeability | | B | C | B | C | B | B |
| | Interfacial free energy $\gamma_{SL}$ | | H | H | VH | H | VH | L |
| | Color developability of color ink | | — | C | — | C | — | B |
| | Total evaluation | | C | | C | | B | |

TABLE 3-3-1

|  |  |  | Ex. 36 | | Ex. 37 | | Ex. 38 | | Ex. 39 | |
|---|---|---|---|---|---|---|---|---|---|---|
|  |  |  | Ink A-1 | Ink B-13 | Ink A-1 | Ink B-14 | Ink A-1 | Ink B-15 | Ink A-1 | Ink B-16 |
| Monomer having surface tension of 39 or greater | Monomer having surface tension of 39 or greater but less than 43 | a1-1 | | 5 | | 5 | | 5 | | 5 |
| | | a2-1 | 38 | | 38 | | 38 | | 38 | |
| | Monomer having surface tension of 43 or greater | a1-3 | | | | | | | | |
| | | a1-4 | 7 | | 7 | | 7 | | 7 | |
| Monomer having surface tension of 34 or less | | a2-1 | 34.7 | | 34.7 | | 34.7 | | 34.7 | |
| | | a2-2 | | | | | | | | |
| | | a2-3 | | 30 | | 30 | | 30 | | 30 |
| | | a2-4 | | | | | | | | |
| Monomer other than above | | a3-1 | 10 | 34.7 | 10 | 19.9 | 10 | 24.9 | 10 | 26.9 |
| | | a3-2 | 10 | | 10 | | 10 | | 10 | |
| Oligomer | | a4-1 | | 0.2 | | 15 | | 10 | | 3 |
| | | a4-2 | | | | | | | | |
| | | a4-3 | | | | | | | | 5 |
| | | a4-4 | | | | | | | | |
| Surface tension modifier | | b-1 | 0.2 | | 0.2 | | 0.2 | | 0.2 | |
| | | b-2 | | | | | | | | |
| Pigment dispersant | | c-1 | | 30 | | 30 | | 30 | | 30 |
| | | c-2 | | | | | | | | |
| | | c-3 | | | | | | | | |
| | | c-4 | | | | | | | | |
| | | c-5 | | | | | | | | |

TABLE 3-3-1-continued

|  |  | Ex. 36 | | Ex. 37 | | Ex. 38 | | Ex. 39 | |
|---|---|---|---|---|---|---|---|---|---|
|  |  | Ink A-1 | Ink B-13 | Ink A-1 | Ink B-14 | Ink A-1 | Ink B-15 | Ink A-1 | Ink B-16 |
| Photopolymerization initiator | d-1 | 0.1 | 0.1 | 0.1 | 0.1 | 0.1 | 0.1 | 0.1 | 0.1 |
| Inkjet recording method (Repeating number of forward and backward main-direction scans over same region) |  | 10 | | 10 | | 10 | | 10 | |
| Evaluation result | Glossiness | 6 | | 7 | | 7 | | 7 | |
|  | Coating film uniformity | B | | B | | B | | B | |
|  | Dischargeability | B | B | B | B | B | B | B | B |
|  | Interfacial free energy $\gamma_{SL}$ | H | L | H | L | H | L | H | L |
|  | Color developability of color ink | — | B | — | B | — | B | — | B |
|  | Total evaluation | A | | A | | A | | A | |

TABLE 3-3-2

|  |  |  | Ex. 40 | | Ex. 41 | | Comp. Ex. 4 | |
|---|---|---|---|---|---|---|---|---|
|  |  |  | Ink A-1 | Ink B-17 | Ink A-1 | Ink B-18 | Ink A-23 | Ink B-1 |
| Monomer having surface tension of 39 or greater | Monomer having surface tension of 39 or greater but less than 43 | a1-1 |  | 5 |  | 5 |  | 5 |
|  |  | a2-1 | 38 |  | 38 |  |  |  |
|  | Monomer having surface tension of 43 or greater | a1-3 |  |  |  |  |  |  |
|  |  | a1-4 | 7 |  | 7 |  | 40 |  |
|  | Monomer having surface tension of 34 or less | a2-1 | 34.7 |  | 34.7 |  | 59.9 |  |
|  |  | a2-2 |  |  |  |  |  |  |
|  |  | a2-3 |  | 30 |  | 30 |  | 30 |
|  |  | a2-4 |  |  |  |  |  |  |
| Monomer other than above |  | a3-1 | 10 | 33.9 | 10 | 29.9 |  | 34.9 |
|  |  | a3-2 | 10 |  | 10 |  |  |  |
| Oligomer |  | a4-1 |  |  |  |  |  |  |
|  |  | a4-2 |  | 1 |  |  |  |  |
|  |  | a4-3 |  |  |  |  |  |  |
|  |  | a4-4 |  |  |  | 5 |  |  |
| Surface tension modifier |  | b-1 | 0.2 |  | 0.2 |  |  |  |
|  |  | b-2 |  |  |  |  |  |  |
| Pigment dispersant | | c-1 |  | 30 |  | 30 |  | 30 |
|  |  | c-2 |  |  |  |  |  |  |
|  |  | c-3 |  |  |  |  |  |  |
|  |  | c-4 |  |  |  |  |  |  |
|  |  | c-5 |  |  |  |  |  |  |
| Photopolymerization initiator |  | d-1 | 0.1 | 0.1 | 0.1 | 0.1 | 0.1 | 0.1 |
| Inkjet recording method (Repeating numeber of forward and backward main-direction scans over same region) |  |  | 10 | | 10 | | 8 | |
| Evaluation result | Glossiness | | 7 | | 7 | | 1 | |
|  | Coating film uniformity | | B | | B | | B | |
|  | Dischargeability | | B | B | B | B | B | B |
|  | Interfacial free energy $\gamma_{SL}$ | | H | L | H | L | H | L |
|  | Color developability of color ink | | — | B | — | B | — | B |
|  | Total evaluation | | A | | A | | D | |

REFERENCE SIGNS LIST

21: supplying roller
22: recording medium
23a, 23b, 23c, 23d: printing unit of each color
24a, 24b, 24c, 24d: light source
25: processing unit
26: printed matter reeling roll
41: inkjet head
42, 43: active energy ray source
44, 54: ink B
45, 55: recording medium
51: inkjet head 52, 53: active energy ray source
56: ink A

The invention claimed is:
1. An ink set for forming multiple layers, the ink set comprising a combination of inks that comprise:
an ink A, which is an active-energy-ray-curable inkjet ink comprising:
a surface tension modifier; and
a monomer having a surface tension of 39 mN/m or greater in an amount of 20% by mass or greater but 48% by mass or less, the surface tension being measured according to a Wilhelmy method;
the monomer including polyethylene glycol (600) diacrylate and/or acryloyl morpholine, and N-vinyl caprolactam and/or tricyclodecane dimethylol diacrylate; and
an ink B, which is an active-energy-ray-curable ink free of the surface tension modifier.

2. The ink set according to claim 1,
wherein the ink A comprises a clear ink and the ink B comprises a color ink.

3. The ink set according to claim 1,
wherein an interfacial free energy $\gamma_{SL}$ at an interface between a cured coating film of the ink B and the ink B in a liquid state is 20.0 mJ/m² or lower.

4. The ink set according to claim 1,
wherein the ink B comprises a monomer having a surface tension of 34 mN/m or less in an amount of 15% by mass or greater but 50% by mass or less.

5. The ink set according to claim 1,
wherein the ink B comprises a monomer having a surface tension of 34 mN/m or less in an amount of 18% by mass or greater but 40% by mass or less.

6. The ink set according to claim 1,
wherein the ink B comprises an oligomer in an amount of 1% by mass or greater but 10% by mass or less.

7. An inkjet recording method using the ink set according to claim 1, the inkjet recording method comprising:
applying the ink B;
applying the ink A;
firstly performing discharging and irradiation with an active energy ray of the ink B; and
secondly performing discharging and irradiation with an active energy ray of the ink A.

8. The inkjet recording method according to claim 7,
wherein the recording method repeats the discharging and irradiation with an active energy ray forward and backward over a same region of an image eight times or more.

9. An inkjet recording apparatus comprising:
a unit configured to discharge an ink; and
the ink set according to claim 1.

10. The ink set according to claim 1,
wherein, in the ink A, an interfacial free energy $\gamma_{SL}$ at an interface between a cured coating film of the inkjet ink and the inkjet ink in a liquid state is 30.0 mJ/m² or higher, and
wherein the interfacial free energy $\gamma_{SL}$ is calculated according to (a) to (f) below,
(a): the inkjet ink is coated over a smooth plate of polycarbonate in a manner that the inkjet ink has a film thickness of about 10 micrometers,
(b): using a LED having a central wavelength of 395 nm, an ink film produced in (a) is irradiated with an integrated energy volume of 3,000 mJ/cm² at an illuminance of 1,000 mW/cm²,
(c): a contact angle θ of the inkjet ink in a liquid state over a cured ink film produced in (b) is measured,
(d): contact angles θ of diiodo-methane, a-bromonaphthalene, pure water, formamide, and ethylene glycol over the cured ink film are measured in the same manner as in (c),
(e): using the contact angles θ of diiodo-methane, α-bromonaphthalene, pure water, formamide, and ethylene glycol, a surface free energy $\gamma_S$ of the cured ink film is calculated using a theoretical formula of Kitazaki and Hata, represented by Formula (1) below, $$\gamma_L(1+\cos\theta)=2(\gamma_L^a\gamma_S^a)^{1/2}+2(\gamma_L^b\gamma_S^b)^{1/2}+2(\gamma_L^c\gamma_S^c)^{1/2}, \quad \text{Formula (1)}$$

(f): the interfacial free energy $\gamma_{SL}$ is calculated using $\gamma_S$, $\gamma_L$, and the contact angle θ of the inkjet ink obtained above according to Young equation represented by Formula (2) below, $$\gamma_{SL}=\gamma_S-\gamma_L\cos\theta. \quad \text{Formula (2)}$$

11. The ink set according to claim 1, wherein the ink A comprises the surface tension modifier in an amount of 0.01% by mass or greater but 0.5% by mass or less.

12. The ink set according to claim 1, wherein the ink A comprises the monomer having the surface tension of 39 mN/m or greater in an amount of 30% by mass or greater but 48% by mass or less, the surface tension being measured according to a Wilhelmy method.

* * * * *